W. R. JONES.
UNLOADING DEVICE.
APPLICATION FILED MAY 10, 1920.
1,392,419.
Patented Oct. 4, 1921.
2 SHEETS—SHEET 2.
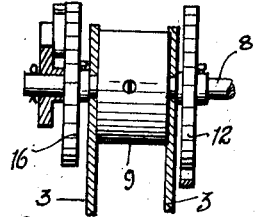
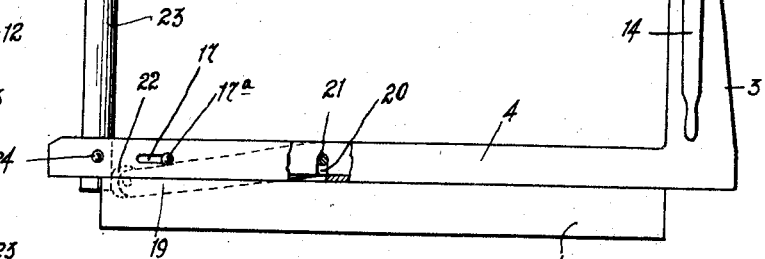
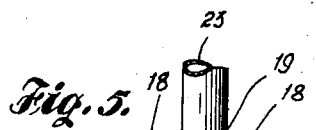
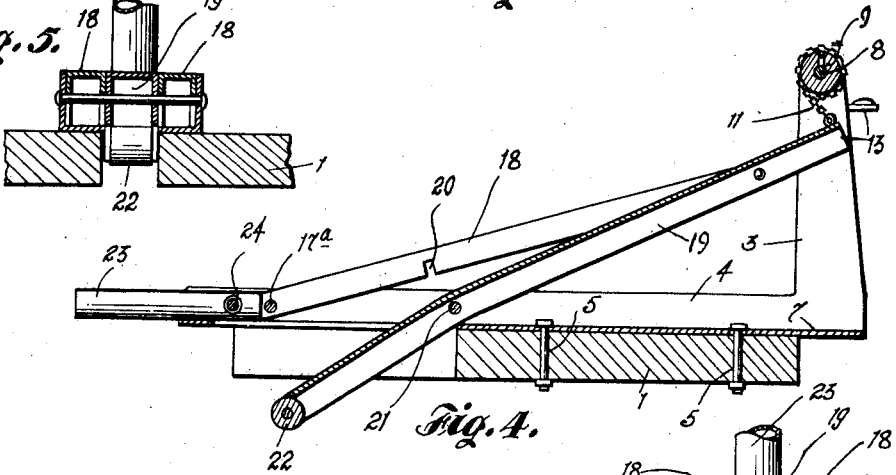
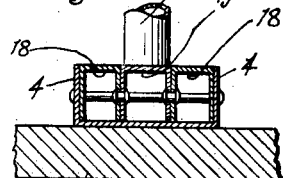
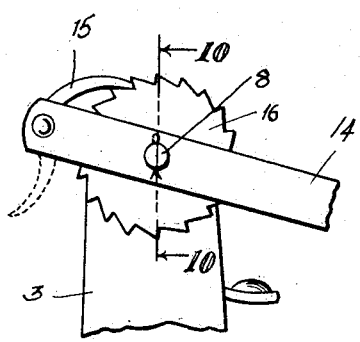
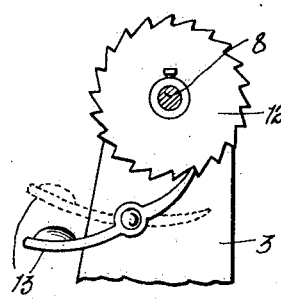
INVENTOR.
William R. Jones
BY John M. Spillman
ATTORNEY

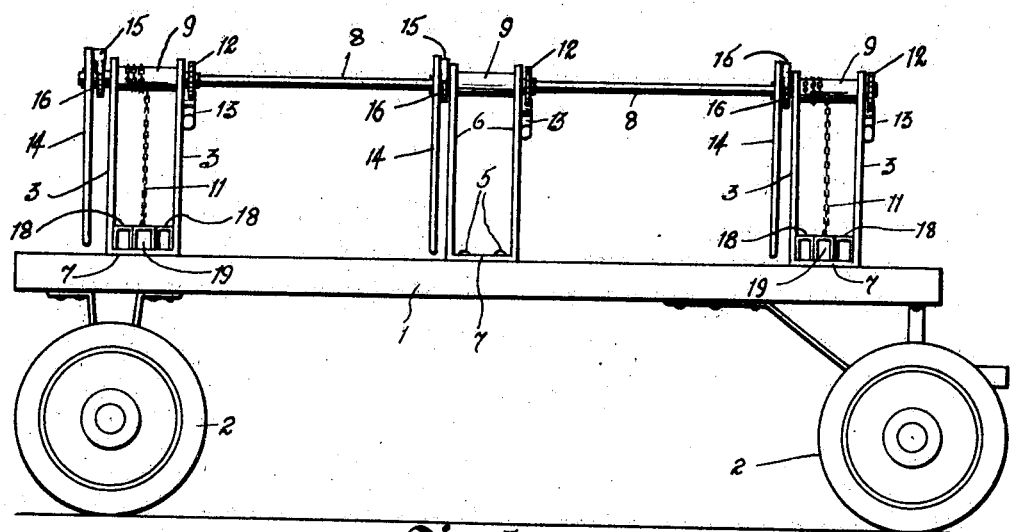
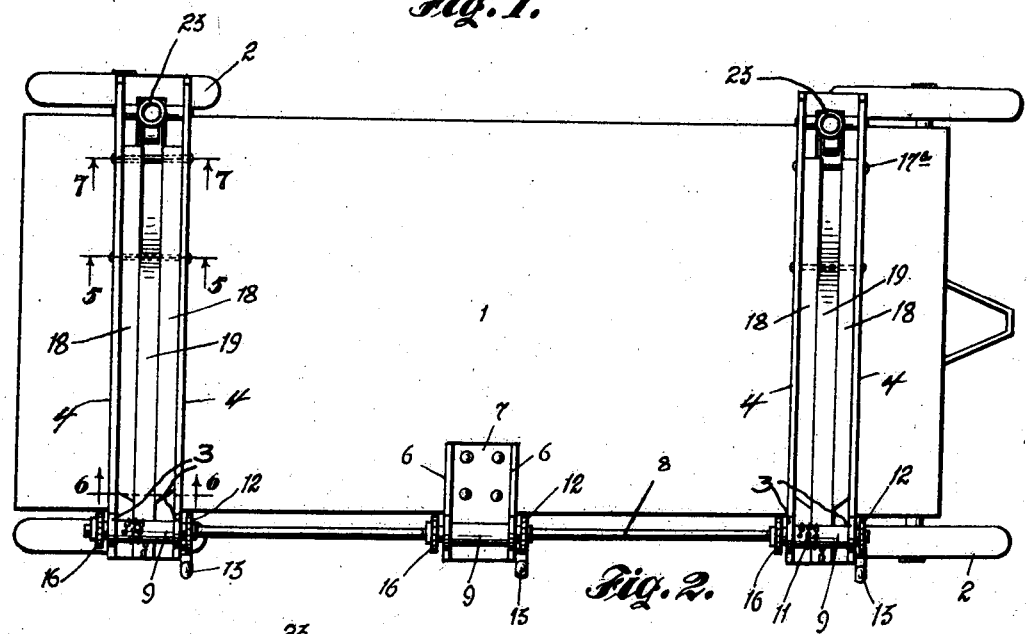
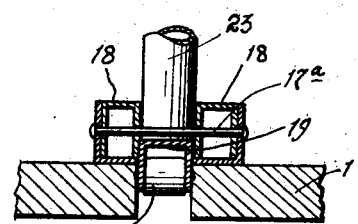

UNITED STATES PATENT OFFICE.

WILLIAM R. JONES, OF MARLIN, TEXAS.

UNLOADING DEVICE.

1,392,419.  Specification of Letters Patent.  Patented Oct. 4, 1921.

Application filed May 10, 1920. Serial No. 380,037.

*To all whom it may concern:*

Be it known that I, WILLIAM R. JONES, a citizen of the United States, residing at Marlin, in the county of Falls and State of Texas, have invented certain new and useful Improvements in Unloading Devices, of which the following is a specification.

This invention relates to improvements in devices for unloading material from trucks and has for its principal object to provide a device for unloading and stacking piping more particularly in oil fields where the saving of time and labor is very essential.

The invention will be more fully understood from the following description, taken in connection with the accompanying drawings, forming part hereof, in which—

Figure 1 is a side elevational view of a truck embodying my invention.

Fig. 2 is a top or plan view.

Fig. 3 is an end elevational view, the truck wheels not shown.

Fig. 4 is a cross sectional view of one end of the device.

Figs. 5, 6 and 7 are sectional detail views, respectively, taken on lines 5—5, 6—6 and 7—7 of Fig. 2.

Figs. 8 and 9 are detail views of the ratchet wheel, lever arm and pawl, respectively, and Fig. 10 is a detail view of the drum, ratchet wheel, etc., taken on line 10—10, Fig. 8.

Referring more particularly to the drawings, 1 denotes the platform or bed of a truck supported upon the wheels 2—2. At each end of the truck bed 1 is a frame comprising the two upright members 3—3 and the horizontal members 4—4, the frame being in one piece and bolted to the truck bed 1 by bolts 5—5, Fig. 4, passing through the base 7. A shaft 8 traverses the upper ends of the uprights 3—3 and 6—6 resting in suitable bearings and between the uprights and fixed upon the shaft 8 is a drum 9, illustrated in Fig. 10, upon which a chain 11 or other flexible element, may be wound. In Fig. 9 is shown in detail a ratchet 12 and pawl 13, adapted to prevent rotation of the shaft in one direction when the shaft 8 is being turned by the lever arm 14 in connection with the ratchet finger 15 which engages the teeth of a ratchet 16.

Disposed between the horizontal members 4—4 at each end of the bed 1 are two lateral arms 18—18. These arms have a pin 17ª, the pin having free movement in a slot 17 in members 4—4. The opposite ends of the lateral arms 18—18 are pivoted to an intermediate arm 19, see Fig. 4. The inner end of the intermediate arm 19 is connected to the chain 11, which, when the lever arms 14—14 are operated, will wind the chain upon the drums 9—9 and raise the intermediate arm 19 and consequently the lateral arms 18—18 to lift the piping in the position for unloading. When in a horizontal position, see Fig. 3, the lateral and intermediate arms are locked in position by the notch 20 into which a pin 21 is received.

As will be noted in Fig. 4, the intermediate arm 19 is bent downward in a line diverging opposite the pin 21, and has on its outer end a roller 22 adapted to abut and lock in an upright position a small movable post 23 pivoted at 24 to the horizontal arm 4, the object of the post being to retain the load upon the truck. As the intermediate arm 19 is lifted upward by rotation of the shaft 8 the post 23 falls outward in the position shown at Fig. 4 and the piping is allowed to roll off the truck.

Having thus described the nature and objects of my invention, what I claim as new and desire to secure by Letters Patent, is—

1. In a device of the character described, a wheeled support, a frame mounted thereon, said frame comprising upright and horizontal arms, a shaft journaled in the upright arms, a lever arm and ratchet wheel at each end and intermediate the frame, a pair of lateral arms pivoted to one side of the frame at each end thereof, a second arm intermediate the lateral arms and pivoted to the inner ends of the lateral arms and means for raising and lowering the arms and locking same in a horizontal position.

2. In a device of the character described, a wheeled support, a frame mounted thereon comprising upright and horizontal arms, lateral and intermediate arms pivoted to the frame, a shaft journaled in the upright arms, drums, lever arms and ratchets upon the shaft, pivoted posts at the side of and supported by the horizontal arms, said intermediate arms bent downward, a roller on the end and adapted to bear against said posts to retain them in an upright position.

3. In a device of the character described, a wheeled support, a frame mounted thereon, a shaft in the frame, a plurality of pivoted arms in the frame, a plurality of drums on the shaft and a flexible member connected to the pivoted arms and arranged to be wound upon the drums to raise and lower the arms in the frame.

In testimony whereof I have signed my name to this specification.

WILLIAM R. JONES.